(12) United States Patent
Chen

(10) Patent No.: US 12,551,028 B1
(45) Date of Patent: Feb. 17, 2026

(54) CHILDREN'S DINING CHAIR

(71) Applicant: Taizhou Xiaotanglang Infant and Child Products Co., Ltd., Taizhou (CN)

(72) Inventor: Jian Chen, Taizhou (CN)

(73) Assignee: Taizhou Xiaotanglang Infant and Child Products Co., Ltd., Taizhou (CN)

( * ) Notice: Subject to any disclaimer, the term of this patent is extended or adjusted under 35 U.S.C. 154(b) by 0 days.

(21) Appl. No.: 19/212,491

(22) Filed: May 19, 2025

(30) Foreign Application Priority Data

Nov. 29, 2024 (CN) .......................... 202422946791.9
Nov. 29, 2024 (CN) .......................... 202422946985.9
Nov. 29, 2024 (CN) .......................... 202422952203.2

(51) Int. Cl.
| | | |
|---|---|---|
| *A47D 1/00* | (2006.01) | |
| *A47D 1/02* | (2006.01) | |
| *A47D 1/04* | (2006.01) | |
| *F16B 12/20* | (2006.01) | |
| *F16B 12/26* | (2006.01) | |

(52) U.S. Cl.
CPC ............. *A47D 1/006* (2013.01); *A47D 1/004* (2013.01); *A47D 1/02* (2013.01); *A47D 1/04* (2013.01); *F16B 12/20* (2013.01); *A47D 1/0085* (2017.05); *F16B 12/26* (2013.01)

(58) Field of Classification Search
CPC .......... A47D 1/006; A47D 1/081; A47D 1/02; A47D 1/023; A47D 1/04; A47D 4/52
See application file for complete search history.

(56) References Cited

U.S. PATENT DOCUMENTS

| | | | | | |
|---|---|---|---|---|---|
| 1,419,947 | A | * | 6/1922 | Schouten | A47K 13/00 4/479 |
| 2,418,731 | A | * | 4/1947 | Seitz | A47C 4/52 297/440.13 |
| 3,397,010 | A | * | 8/1968 | Leimgruber | A47D 1/02 248/231.71 |
| 3,516,709 | A | * | 6/1970 | Nader | A47D 1/0085 297/183.5 |
| 4,108,489 | A | * | 8/1978 | Salzman | B62B 3/144 280/33.993 |
| 5,560,679 | A | * | 10/1996 | Barnholdt | A47D 1/02 297/423.26 |
| 11,202,518 | B1 | * | 12/2021 | Lo | A47D 1/106 |
| 11,284,727 | B2 | * | 3/2022 | Bernardo | A47D 1/0085 |
| 11,317,734 | B2 | * | 5/2022 | Yang | A47D 3/00 |

(Continued)

FOREIGN PATENT DOCUMENTS

| | | | | |
|---|---|---|---|---|
| CN | 111387755 A | * | 7/2020 | A47D 11/00 |
| CN | 111904209 A | * | 11/2020 | A47D 1/04 |

(Continued)

*Primary Examiner* — Timothy J Brindley

(57) ABSTRACT

A children's dining chair includes a base, handles, and a backrest. A left side, a right side, and a rear side of the base are provided with blocking walls. A first storage slot is defined in the blocking walls. The handles are detachably arranged on the left side and the right side of the base. The backrest is detachably arranged on the rear side of the base. When the handles and backrest are disassembled from the base, the handles and the backrest are capable of being stored in the first storage slot.

19 Claims, 14 Drawing Sheets

(56) References Cited

U.S. PATENT DOCUMENTS

| | | | | |
|---|---|---|---|---|
| 2014/0077534 A1* | 3/2014 | Stolarz | ............... | A47D 1/0085 |
| | | | | 297/174 R |
| 2017/0258244 A1* | 9/2017 | Waldman | ................ | A47D 1/10 |
| 2019/0082856 A1* | 3/2019 | Chidiac Haddad | .... | A47D 1/023 |
| 2020/0093280 A1* | 3/2020 | Moriarty | .............. | A47D 1/0085 |
| 2023/0146888 A1* | 5/2023 | Dziak | ................... | A47D 1/006 |
| | | | | 182/33 |
| 2023/0200556 A1* | 6/2023 | Pavan | .................... | A47D 1/103 |

FOREIGN PATENT DOCUMENTS

| | | | | | |
|---|---|---|---|---|---|
| CN | 220236500 U | * | 12/2023 | ........... | A47D 1/0085 |
| GB | 2126474 A | * | 3/1984 | ........... | A47D 13/102 |
| GB | 2432514 A | * | 5/2007 | .............. | A47C 4/52 |
| GB | 2498421 A | * | 7/2013 | ............. | A47D 1/103 |
| KR | 20230073494 A | * | 5/2023 | ............. | A47D 1/006 |
| WO | WO-2024132144 A1 | * | 6/2024 | ........... | A47D 15/006 |
| WO | WO-2025027069 A1 | * | 2/2025 | ............. | A47D 1/002 |

* cited by examiner

CHILDREN'S DINING CHAIR

CROSS-REFERENCE TO RELATED APPLICATIONS

The application claims priority of Chinese patent application CN2024229467919, filed on Nov. 29, 2024, which is incorporated herein by reference in its entireties; the application also claims priority of Chinese patent application CN2024229522032, filed on Nov. 29, 2024, which is incorporated herein by reference in its entireties; the application also claims priority of Chinese patent application CN2024229469859, filed on Nov. 29, 2024, which is incorporated herein by reference in its entireties.

TECHNICAL FIELD

The present invention relates to the field of children's dining chairs, particularly to a children's dining chair.

BACKGROUND ART

Children's dining chairs provides convenience for infants and young children during meals and have become one of the indispensable children's products in the process of children's growth. Chinese invention 2022212294398 discloses a children's dining chair, including a seat extending in a front-rear direction in an unfolded state, a backrest extending in an up-down direction, two sets of side enclosures extending in the up-down direction, and a dining plate component.

The patent has the following defects. The side enclosure and the backrest in this patent are connected to the seat through rotating structures. The rotating structure between the side enclosure and the seat, and the rotating structure between the backrest and the seat, will occupy a part of folding space after the side enclosure and the backrest are folded, so that a length of the rotating structure needs to be considered when lengths of the backrest and the side enclosure are designed, thereby making it impossible for the backrest and the side enclosure to be too long, and further causing the lengths of the backrest and the side enclosure to be unsuitable for users. In addition, after the side enclosure is folded, a storage space between the side enclosure and the seat is wasted, resulting in poor space utilization in the children's dining chair after folding, and making the volume of the children's dining chair still too large after folding.

SUMMARY

In order to overcome the shortcomings of the prior art, a children's dining chair is provided in the present invention. Handles and a backrest can be stacked inside a base, thereby effectively utilizing a space in the base to achieve storage, and making the handles, the backrest, and the base more compact when stored and folded.

The technical solution adopted by the present invention to solve its technical problem is as follow.

A children's dining chair is provided in the present invention, including a base, handles, and a backrest. A left side, a right side, and a rear side of the base are provided with blocking walls. A first storage slot is defined in the blocking walls. The handles are detachably arranged on the left side and the right side of the base. The backrest is detachably arranged on the rear side of the base. When the handles and the backrest are disassembled from the base, the handles and the backrest are capable of being stored in the first storage slot.

Beneficial effects of the present invention are as follows. The children's dining chair is provided in the present invention. The base is provided with the blocking walls, and the handles and the backrest can be stacked inside the base, so that the space in the base is effectively utilized to achieve storage, and the handles, the backrest, and the base are stored and folded more compactly.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
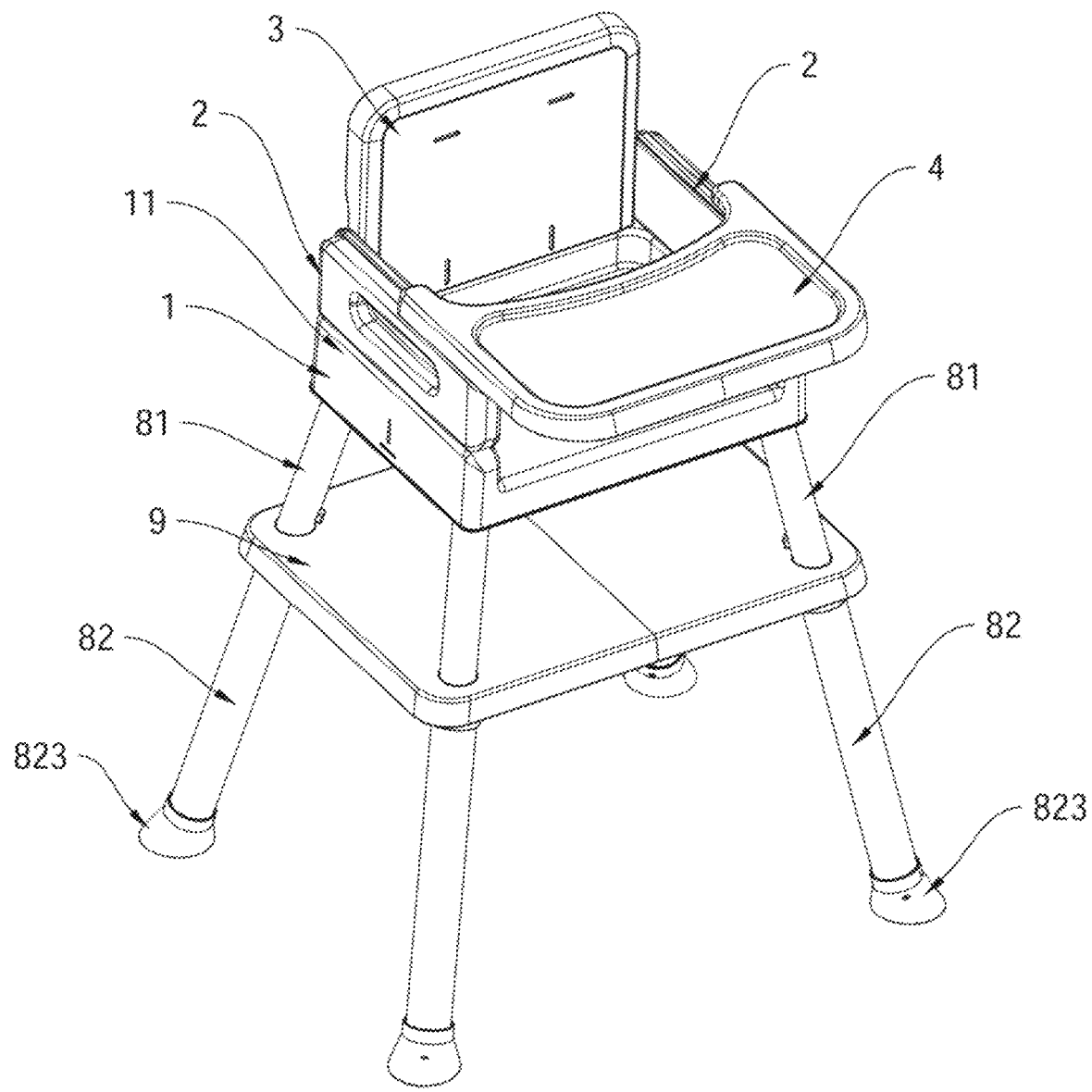
FIG. 1 is a schematic structural diagram of a children's dining chair after assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
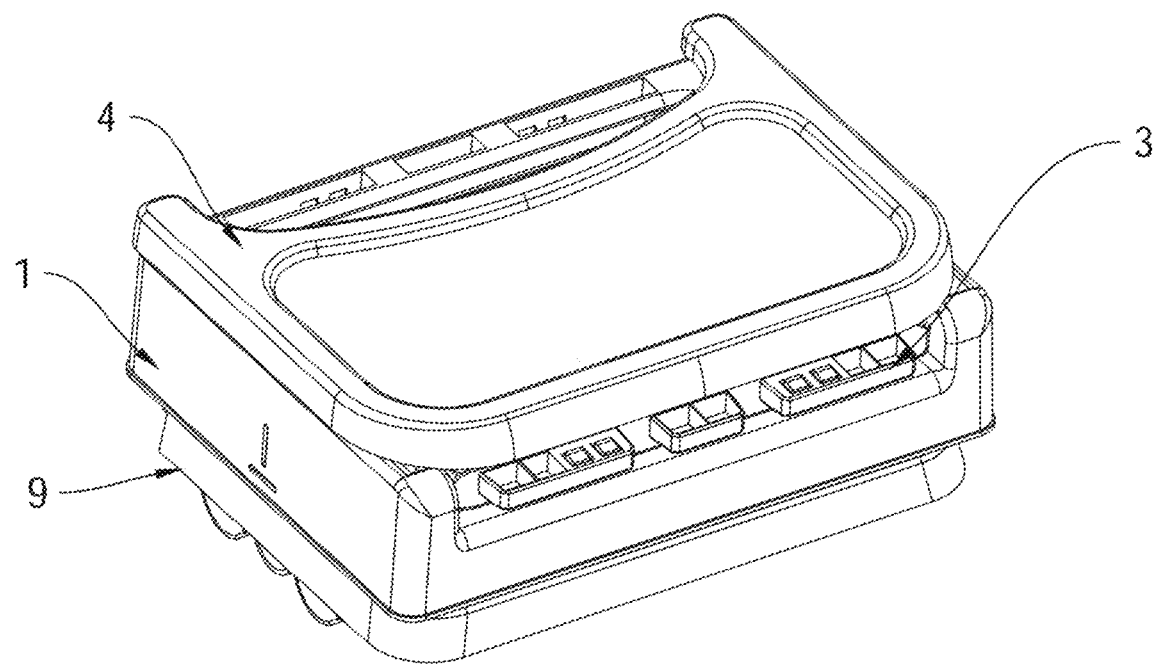
FIG. 2 is a schematic structural diagram of a children's dining chair after folding.
Figure 12:
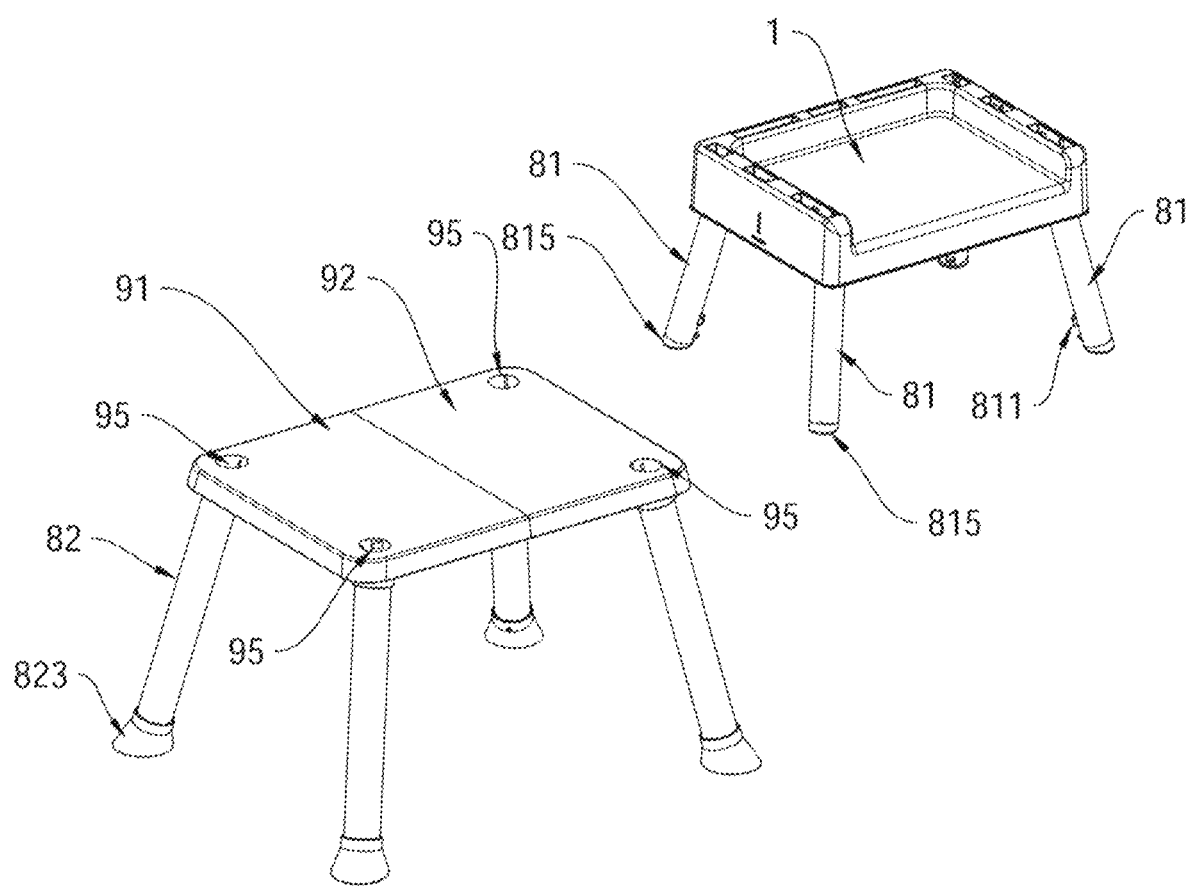
FIG. 12 is a diagram of a used state of a children's dining chair after disassembly.

A children's dining chair includes a base 1, handles 2, and a backrest 3. A dining board 4 is further arranged above the base 1. A support leg component and a pedal 9 are installed below the base 1. The support leg component includes first support legs 81 and second support legs 82. The pedal 9 is positioned between the first support leg 81 and the second support leg 82. As shown in FIG. 1 and FIG. 2, in this patent, the children's dining chair has a used state and a folded state. In the used state, the base 1, the handle 2, the backrest 3, the dining board 4, the first support leg 81, the second support leg 82, and the pedal 9 are respectively connected up and down to form a whole. At this time, the base 1 is used for children to sit on, and support is achieved through the first support leg 81, the second support leg 82, and the pedal 9. The pedal 9 and the second support leg 82 can also be disassembled separately. As shown in FIG. 12, the first support leg 81 is fixed under the base 1, the second support leg 82 is connected under the pedal 9, and the first support leg 81 is not connected to the pedal 9. At this time, the base 1 is connected to the first support leg 81 and supported by the first support leg 81, and the pedal 9 is connected to the second support leg 82 and supported by the second support leg 82 to serve as a dining table. As shown in FIG. 2, in the folded state, the base 1, the handle 2, the backrest 3, the dining board 4, the first support leg 81, the second support leg 82, and the pedal 9 are stored and folded into a smaller square block for easy transportation.

Figure 3:
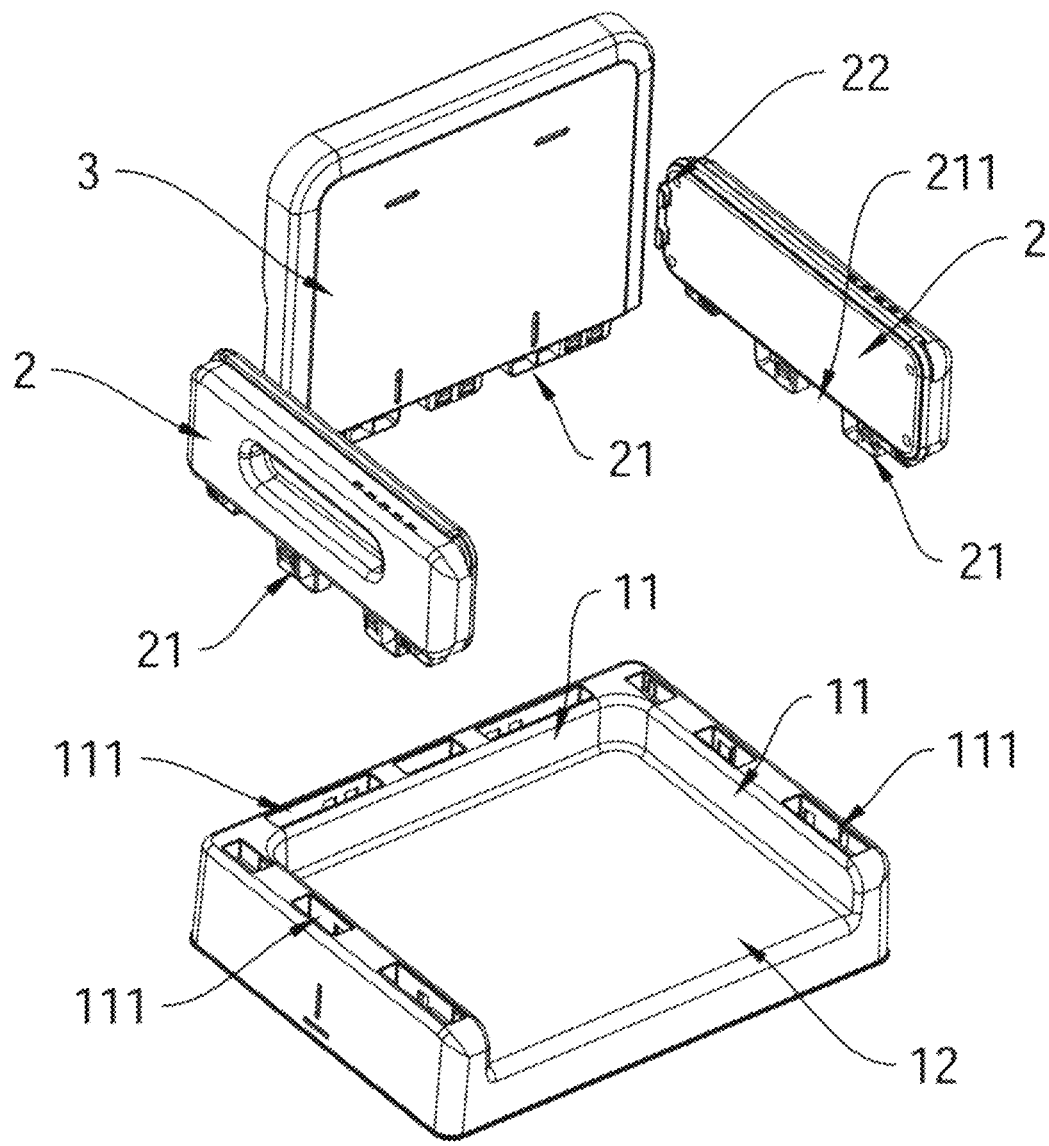
FIG. 3 is a schematic diagram of disassembly of handles and a backrest on a base viewed from a front side.
Figure 4:
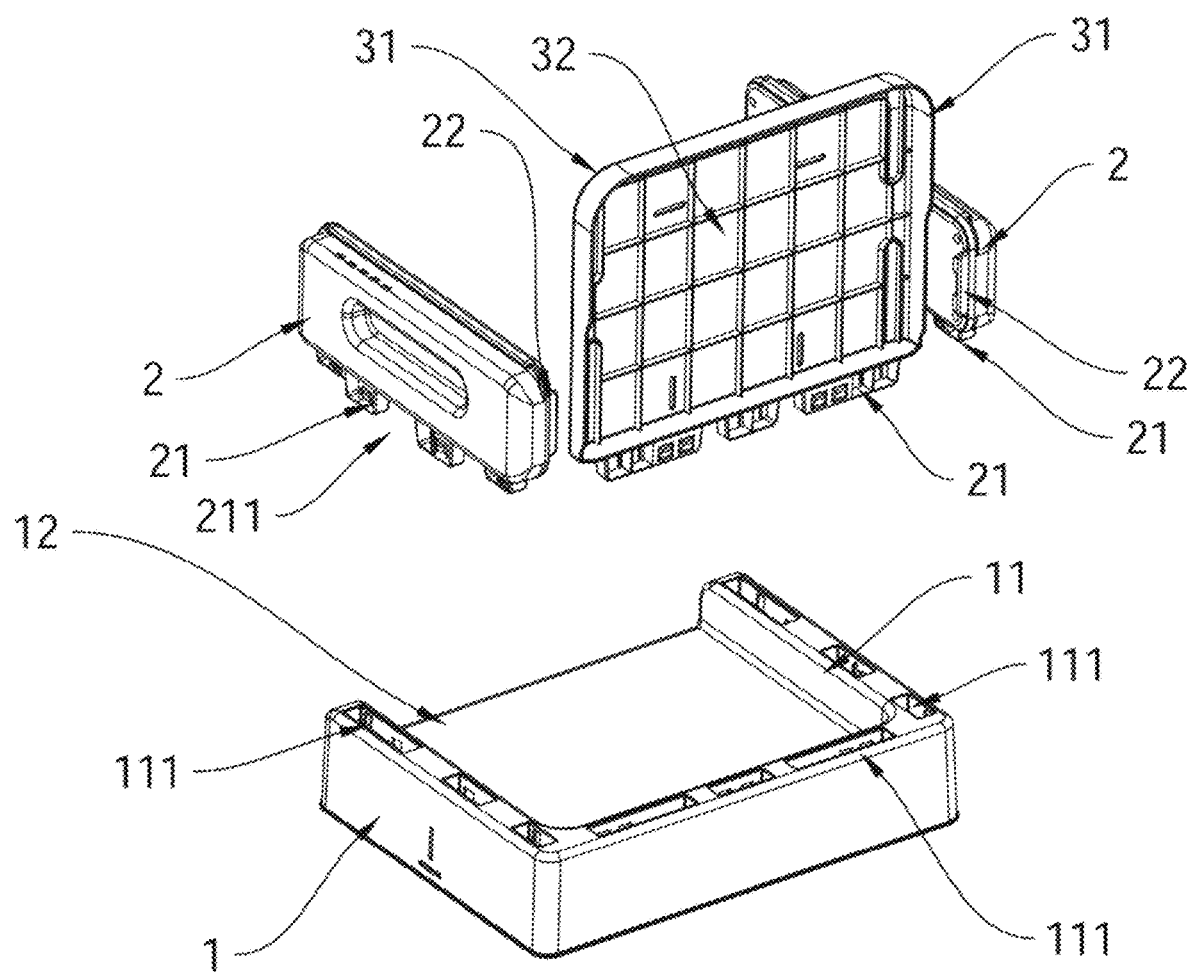
FIG. 4 is a schematic diagram of disassembly of handles and a backrest on a base viewed from a rear side.
Figure 5:
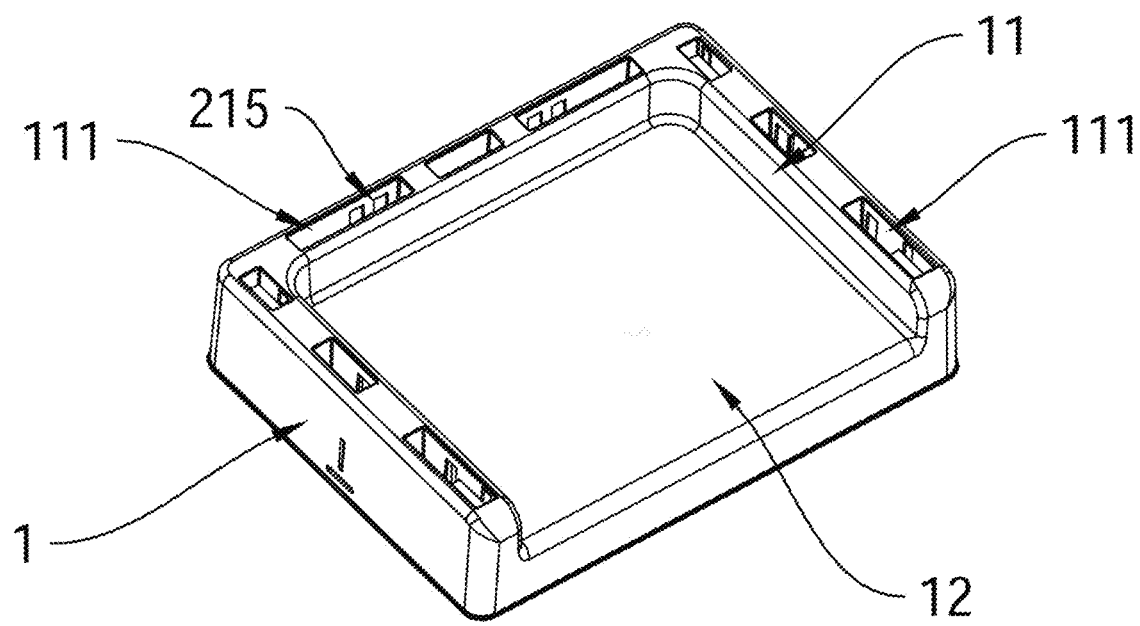
FIG. 5 is a schematic structural diagram of a base.

Specifically, as shown in FIGS. 3-5, the base 1 is square in shape as a whole. A left side, a right side, and a rear side of the square base 1 are provided with blocking walls 11. The blocking walls 11 are integrally formed and vertically arranged. The blocking walls 11 on the three sides are connected to each other to form a first storage slot 12 inside. The handles 2 are detachably disposed on the blocking walls 11 on the left side and the right side of the base 1. The backrest 3 is detachably disposed on the blocking wall 11 on the rear side of the base 1. A top portion of the blocking wall 11 is provided with splitting insertion slots 111. One end of the handle 2 and one end of the backrest 3 are provided with splitting insertion pins 21 corresponding to the splitting insertion slots 111. The handle 2 and the backrest 3 are configured to be fixed on the base 1 through the splitting insertion slot 111 and the splitting insertion pin 21, or to be stored in the first storage slot 12.

As shown in FIG. 5, the handle 2 and the backrest 3 are in a panel shape. In this embodiment, one end of the handle 2 is provided with the plurality of splitting insertion pins 21. The plurality of splitting insertion pins 21 are arranged at intervals in sequence. A gap portion 211 is formed between adjacent splitting insertion pins 21. Similarly, one end of the backrest 3 is also provided with the plurality of splitting insertion pins 21. One side of the splitting insertion pin 21 is provided with protruding elastic blocks 214. Correspondingly, a side wall of the splitting insertion slot 111 is provided with splitting snap-fit slots 215 corresponding to the elastic blocks 214. A surface of the elastic block 214 is provided with an inclined surface. During installation, the assembly personnel operate the backrest 3 or the handle 2 to align the splitting insertion pin 21 with the splitting insertion slot 111, the inclined surface of the elastic block 214 is pressed against an outer wall of the splitting insertion slot 111 to move the elastic block 214 inward, and when the elastic block 214 is opposite to the splitting snap-fit slot 215, the elastic block 214 is then restored, so that the elastic block 214 is snapped into the splitting snap-fit slot 215 to achieve fixation, and at this time the assembly of the handle 2 and the backrest 3 is achieved.

When the handle 2 and the backrest 3 are not assembled, the handle 2 and the backrest 3 are stored and folded in the first storage slot 12. Since the base 1 is provided with the blocking wall 11, the handle 2 and the backrest 3 can be stacked inside the base 1, thereby effectively utilizing the space in the base 1 for storage, and making the handle 2, the backrest 3, and the base 1 stored and folded more compactly.

Figure 6:
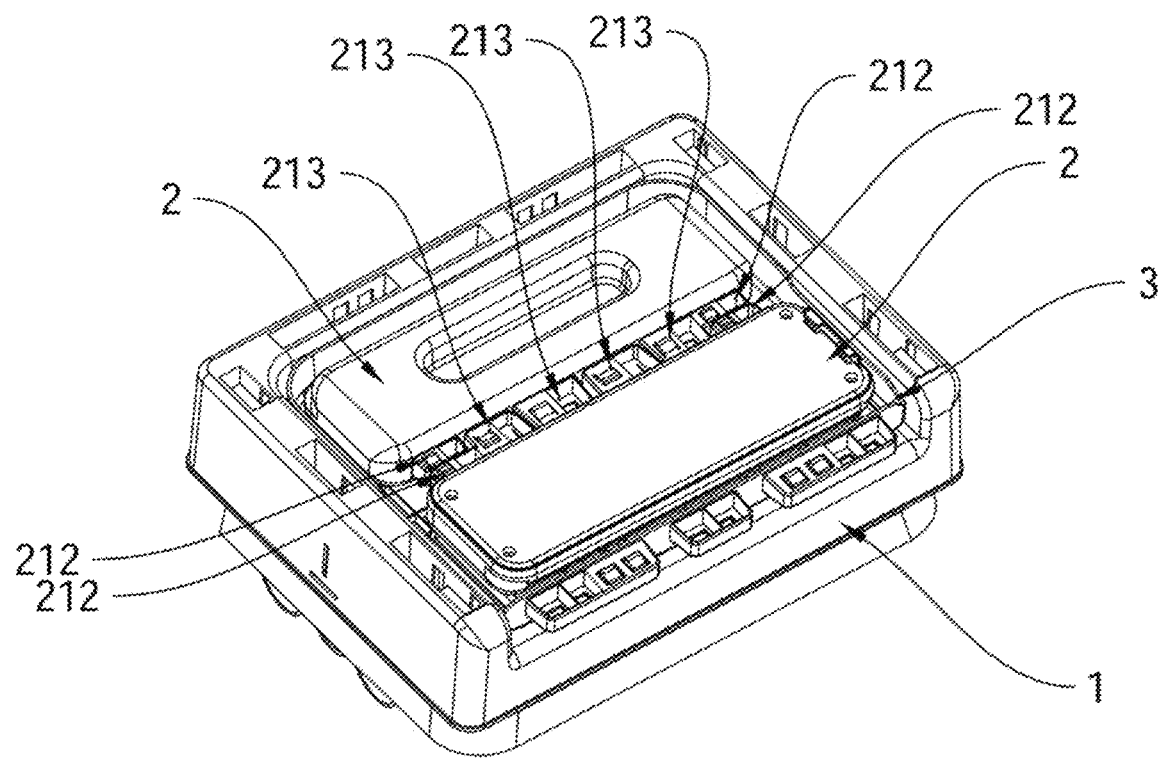
FIG. 6 is a schematic structural diagram of arranging handles and a backrest inside a base.
Figure 7:
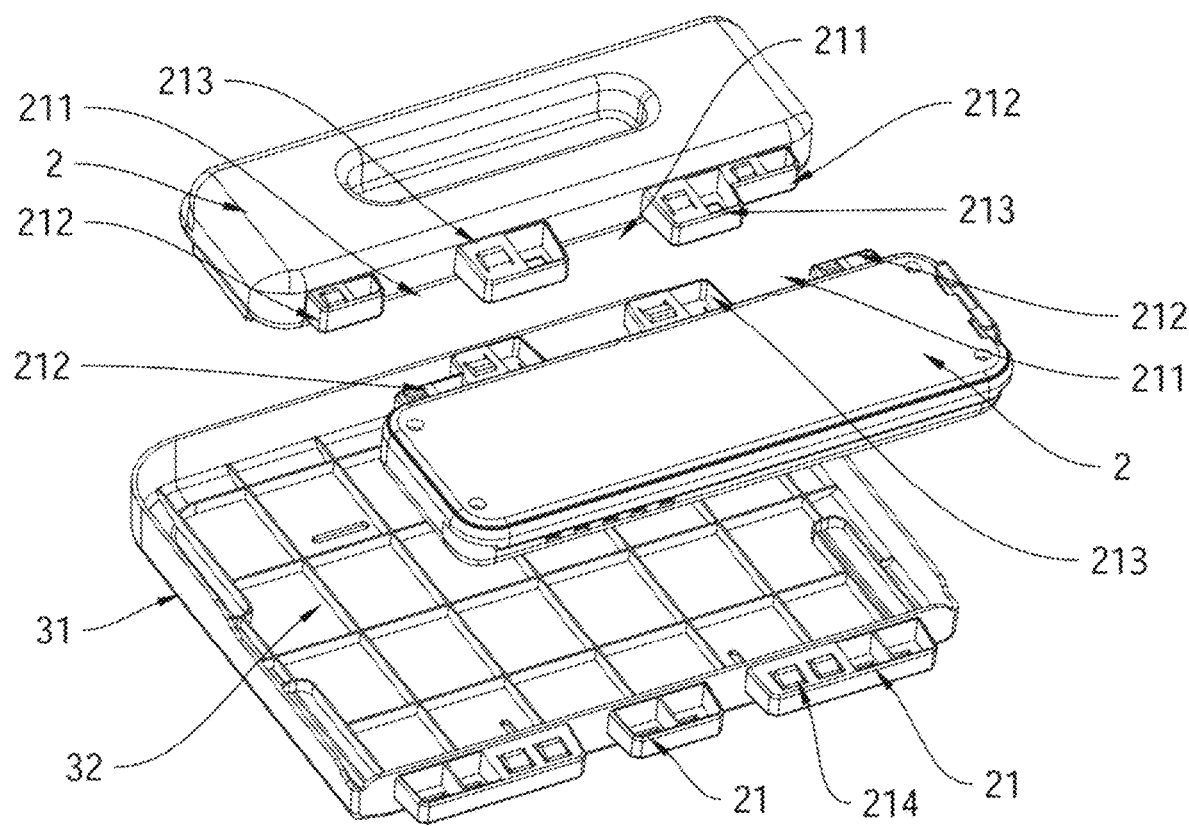
FIG. 7 is an exploded schematic diagram of handles and a backrest.

As shown in FIG. 6 and FIG. 7, in fact, outer edges of the backrest 3 are equipped with backrest blocking edges 31. A second storage slot 32 is formed behind the backrest 3. A depth of the second storage slot 32 is equivalent to a thickness of the two handles 2, so that the two handles 2 can be effectively placed in the second storage slot 32, thereby making the handles 2 and the backrest 3 folded more compactly.

As shown in FIG. 6 and FIG. 7, since the handle 2 in the present patent is provided with the plurality of splitting insertion pins 21, the splitting insertion pins 21 are arranged at intervals in sequence, and the gap portion 211 is formed between adjacent splitting insertion pins 21, the splitting insertion pins 21 on the two handles 2 are arranged in a staggered manner. When the handles 2 are installed in the second storage slot 32, the splitting insertion pins 21 on one of the handles 2 are positioned in the gap portions 211 of the other one of the handles 2. When the two handles 2 are stored in the second storage slot 32, the staggered interlocking connection of the splitting insertion pins 21 on the two handles 2 allows for more compact storage of the two handles 2, thereby reducing the volume after folding.

Furthermore, the splitting insertion pins 21 at least include short splitting insertion pins 212 arranged at both ends of the handle 2, and a plurality of long splitting insertion pins 213 positioned between the two short splitting insertion pins 212. One of the short splitting insertion pins 212 is connected to the long splitting insertion pin 213. When the two handles 2 are installed in the second storage slot 32, the short splitting insertion pins 212 on one of the handles 2 are used for aligning with and abutting against the short splitting insertion pins 212 on the other one of the handles 2, and the long splitting insertion pins 213 on one of the handles 2 are staggered with the long splitting insertion pins 213 on the other one of the handles 2. The mutual abutment of the short splitting insertion pins 212 facilitates the user to locate the storage position of the handles 2 and accelerates the storage speed of the handles 2.

In addition, since the handles 2 and the backrest 3 are fixed to the base 1 through the splitting insertion pins 21, the structure of the splitting insertion pins 21 will be hidden in the base 1 after the splitting insertion pins 21 are installed in the splitting insertion slots 111, so as not to be exposed and affect the actual height of the handles 2 and backrest 3, so that the size of the handles 2 and the backrest 3 can be made larger. Moreover, through the staggered arrangement of the splitting insertion pins 21, the handles 2 and the backrest 3 with the larger size can be compactly stored on the base 1.

Furthermore, one side of the handle 2 near the backrest 3 is provided with a side blocking portion 22. When the handle 2 and the backrest 3 are fixed on the base 1, the side blocking portion 22 is supported on a rear side surface of the backrest 3. As shown in FIG. 4, the side blocking portion 22 is integrally formed on a side surface of one end of the handle 2. The side blocking portion 22 includes a side blocking hook. The side blocking hook is configured to be hooked on an outer blocking edge. Through the side blocking hook, the backrest 3 is better stabilized, and the stability of the backrest 3 after installation is increased.

Furthermore, the handle 2 is equipped with a detachable dining board 4, and an adjusting component is provided between the dining board 4 and the handle 2. The adjusting component includes:

an adjusting seat 5 fixed on the dining board 4; wherein an adjusting cavity is defined between the adjusting seat 5 and the dining board 4;

an adjusting sliding strip 6 slidably arranged in the adjusting cavity; and an adjusting block 7 arranged on the adjusting sliding strip 6, wherein inclined surface portions 71 in contact with each other are provided between the adjusting block 7 and the adjusting sliding strip 6, adjusting limiting slots 23 are defined in the handle 2, and the adjusting block 7 is also equipped with an adjusting limiting end 72 for passing through the adjusting seat 5 and positioned in the adjusting limiting slot 23.

The adjusting cavity is also internally equipped with a first adjusting restoration member 61 and a second adjusting restoration member 62. The first adjusting restoration member 61 is used for giving the adjusting limiting end 72 a tendency to move towards the adjusting limiting slot 23, and the second adjusting restoration member 62 is used for giving the adjusting sliding strip 6 a sliding tendency, so that the inclined surface portions 71 between the adjusting block 7 and the adjusting sliding strip 6 are in contact with each other and slide.

As shown in FIGS. 8-11, the adjusting seat 5 is in a strip shape and is arranged at a top portion of the handle 2. The dining board 4 is fixed above the adjusting seat 5. A front end and a rear end of the adjusting seat 5 are each equipped with an adjusting fastening pin 53. The dining board 4 is provided with adjusting fastening holes opposite to the adjusting fastening pins 53. The dining board 4 is connected to the adjusting seat 5 by arranging fastening members in the adjusting fastening holes. The fastening members are usually screws. At the same time, the adjusting cavity is formed between the adjusting seat 5 and the dining board 4.

The adjusting sliding strip 6 is in a strip shape and is placed between the adjusting seat 5 and the dining board 4. Correspondingly, an adjusting strip-shaped slot 66 for accommodating the adjusting fastening pin 53 is defined in the adjusting sliding strip 6. When the adjusting sliding strip 6 slides, the adjusting fastening pin 53 slides in the adjusting strip-shaped slot 66 to guide the sliding of the adjusting sliding strip 6. The adjusting sliding strip 6 consists of two parts, including a first adjusting portion 63 and a second adjusting portion 64 which are arranged front and back. The first adjusting portion 63 is specifically an enclosure wall which surrounds to form a square shape. A first adjusting slot 631 is defined in the first adjusting portion 63. A top portion of the enclosure wall is provided with the inclined surface portion 71. The adjusting block 7 is positioned in the first adjusting slot 631. The adjusting seat 5 is actually provided with a through hole. A lower end of the adjusting block 7, that is, the adjusting limiting end 72, passes through the through hole on the adjusting seat 5 to the adjusting limiting slot 23 in the handle 2.

Figure 10:
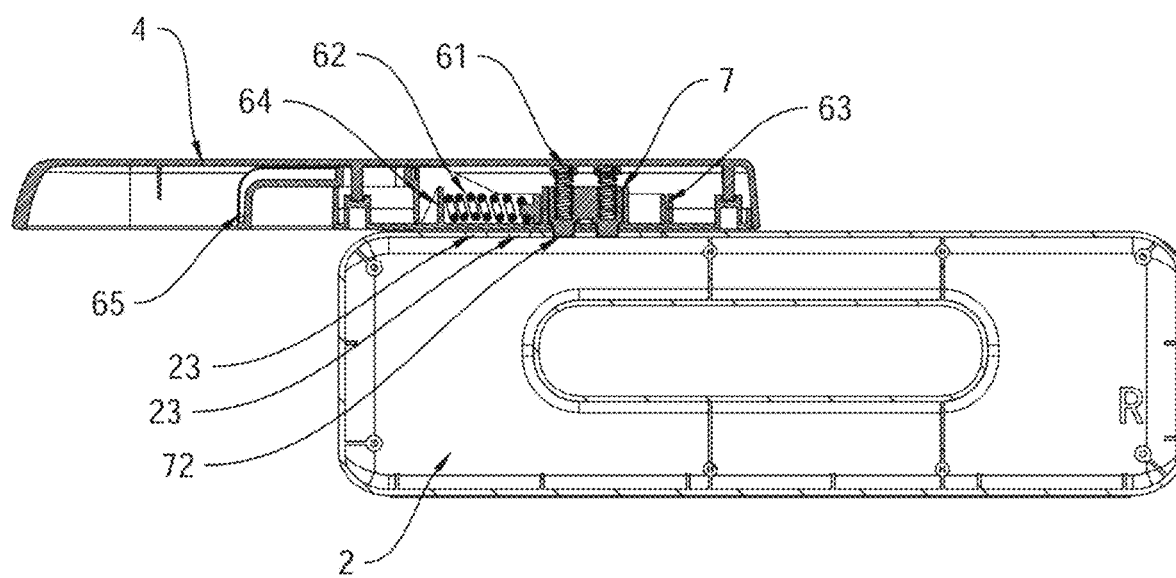
FIG. 10 is a second schematic cross-sectional view of an adjusting component at a dining board and a handle.
Figure 11:
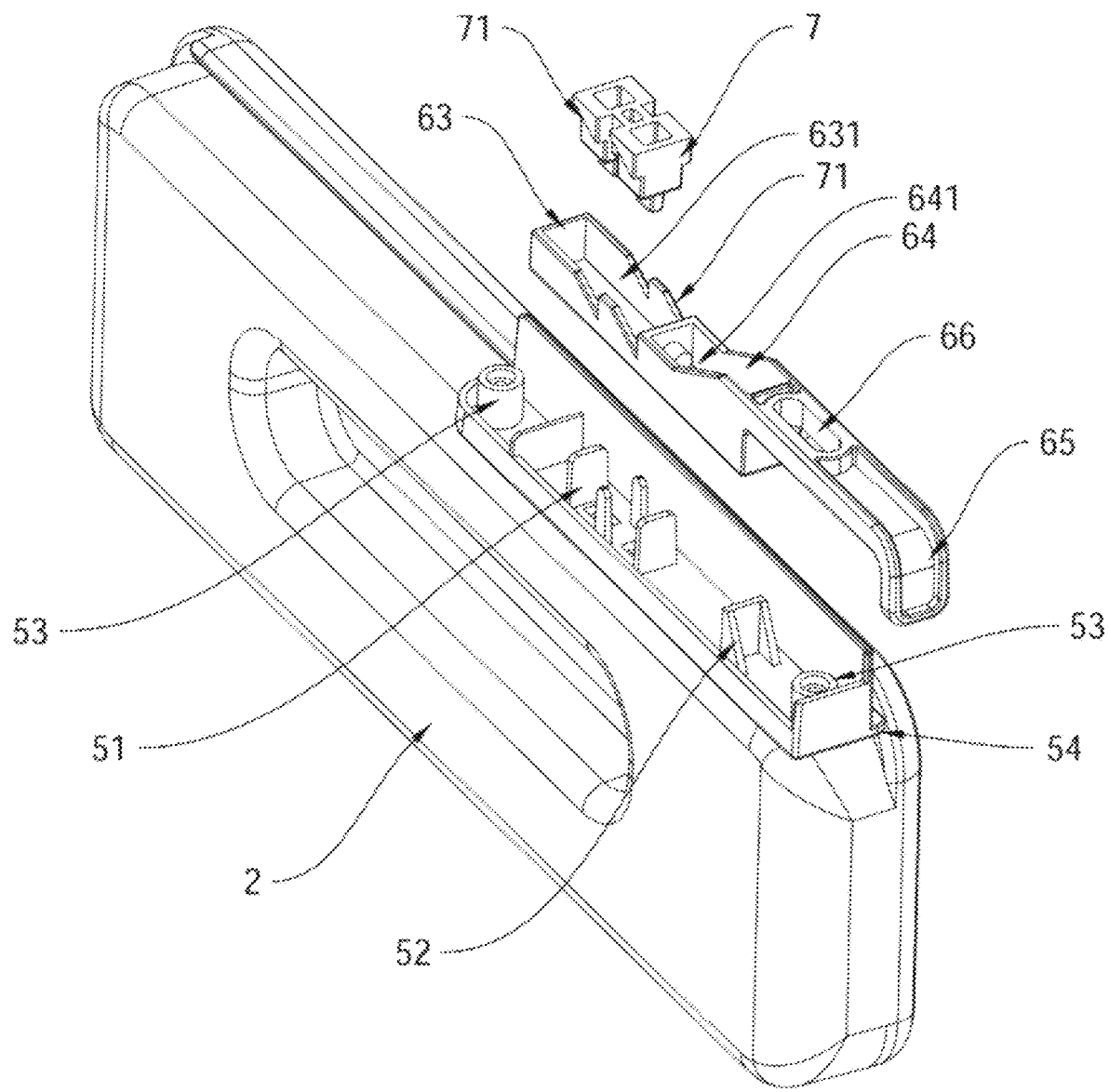
FIG. 11 is an exploded schematic diagram of an adjusting component after a dining board is disassembled.

Specifically, referring to FIG. 11, the left and right sides of the adjusting block 7 and the left and right sides of the first adjusting slot 631 of the adjusting sliding strip 6 are provided with corresponding inclined surface portions 71. When the adjusting block 7 is positioned in the first adjusting slot 631, the left and right sides of the adjusting block 7 are supported on the left and right sides of the first adjusting slot 631. An inner cavity with an upward opening is defined in the adjusting block 7. The first adjusting restoration member 61 is provided in the inner cavity. The first adjusting restoration member 61 is a spring. An upper end of the first adjusting restoration member 61 abuts against the dining board 4, and a lower end of the first adjusting restoration member 61 presses the adjusting block 7 downwards, so that the inclined surface portions 71 between the adjusting block 7 and the adjusting sliding strip 6 are in contact with each other. The second adjusting portion 64 is also an enclosure wall that surrounds to form a square shape, and is integrally formed with the first adjusting slot 631. A second adjusting slot 641 is used for arranging the second adjusting restoration member 62, as shown in FIG. 10 and FIG. 11. The adjusting seat 5 is provided with a restoration support arris 52 penetrating into the second adjusting slot 641. The restoration support arris 52 is vertically arranged and opposite to one side wall of the second adjusting portion 64. The second adjusting restoration member 62 is arranged between the restoration support arris 52 and a slot wall of the second adjusting slot 641. The second adjusting restoration member 62 is specifically a spring, and is used for driving the adjusting sliding strip 6 to move towards one side through a restoration force of the spring. One operating portion 65 is further provided outside the second adjusting portion 64. The operating portion 65 extends out of the handle 2 and is positioned below the dining board 4. The operating portion 65 is bent downward for the user to press to slide the adjusting sliding strip 6. A sliding direction of the adjusting sliding strip 6 is opposite to a driving direction of the second adjusting restoration member 62.

When in a locked state, under the action of the first adjusting restoration member 61, the adjusting limiting end 72 of the adjusting block 7 is positioned in the adjusting limiting slot 23. By inserting the adjusting limiting end 72 into the adjusting limiting slot 23, the dining board 4 is fixed on the handle 2. When it is necessary to remove the dining board 4, a driving end of the adjusting sliding strip 6 is operated to enable the adjusting sliding strip 6 to overcome the resistance of the second adjusting restoration member 62 and slide, so that the inclined surface portions 71 between the adjusting sliding strip 6 and the adjusting block 7 are in contact with each other. During the sliding process, under the action of the inclined surface portion 71, the adjusting block 7 overcomes the resistance of the first adjusting restoration member 61 and slides, so that the adjusting limiting end 72 is separated from the adjusting limiting slot 23. At this time, the adjusting seat 5 and the dining board 4 can be removed from the handle 2.

In order to increase the stability of the installation of the dining board 4, the handle 2 is equipped with a guiding slot 24 with a slot opening perpendicularly intersecting with a movement direction of the adjusting block 7. The adjusting seat 5 is equipped with a guiding engaging strip 54 positioned inside the guiding slot 24. The guiding slot 24 is defined in a top portion of the handle 2. The guiding engaging strip 54 is positioned at a bottom portion of the adjusting seat 5. An opening direction of the guiding slot 24 is perpendicular to the movement direction of the adjusting block 7. After the guiding engaging strip 54 is clamped into the guiding slot 24, the adjusting limiting end 72 of the adjusting block 7 is inserted into the adjusting limiting slot 23 at the same time. At this time, radial limiting is achieved through the guiding engaging strip 54 and the guiding slot 24, and transverse limiting is achieved through adjusting limiting end 72 and the adjusting limiting slot 23, so that the dining board 4 is more stably fixed on the handle 2.

In summary, this patent achieves rapid installation and disassembly of the dining board 4 through the adjusting component. The adjusting component is well hidden between the dining board 4 and the handle 2, which does not affect a child sitting in the base 1.

Furthermore, the handle 2 is provided with the plurality of adjusting limiting slots 23, so that an adjusting end of the adjusting block 7 is positioned in different adjusting limiting slots 23 through the sliding of the adjusting sliding strip 6.

In this embodiment, a total number of the adjusting limiting slots 23 is six. The adjusting block 7 is provided with two adjusting limiting ends 72. After the adjusting limiting end 72 is separated from the adjusting limiting slot 23, the user can slide the adjusting seat 5 to make the adjusting limiting end 72 opposite to different adjusting limiting slots 23, so as to realize a change in the position of the dining board 4.

Figure 8:
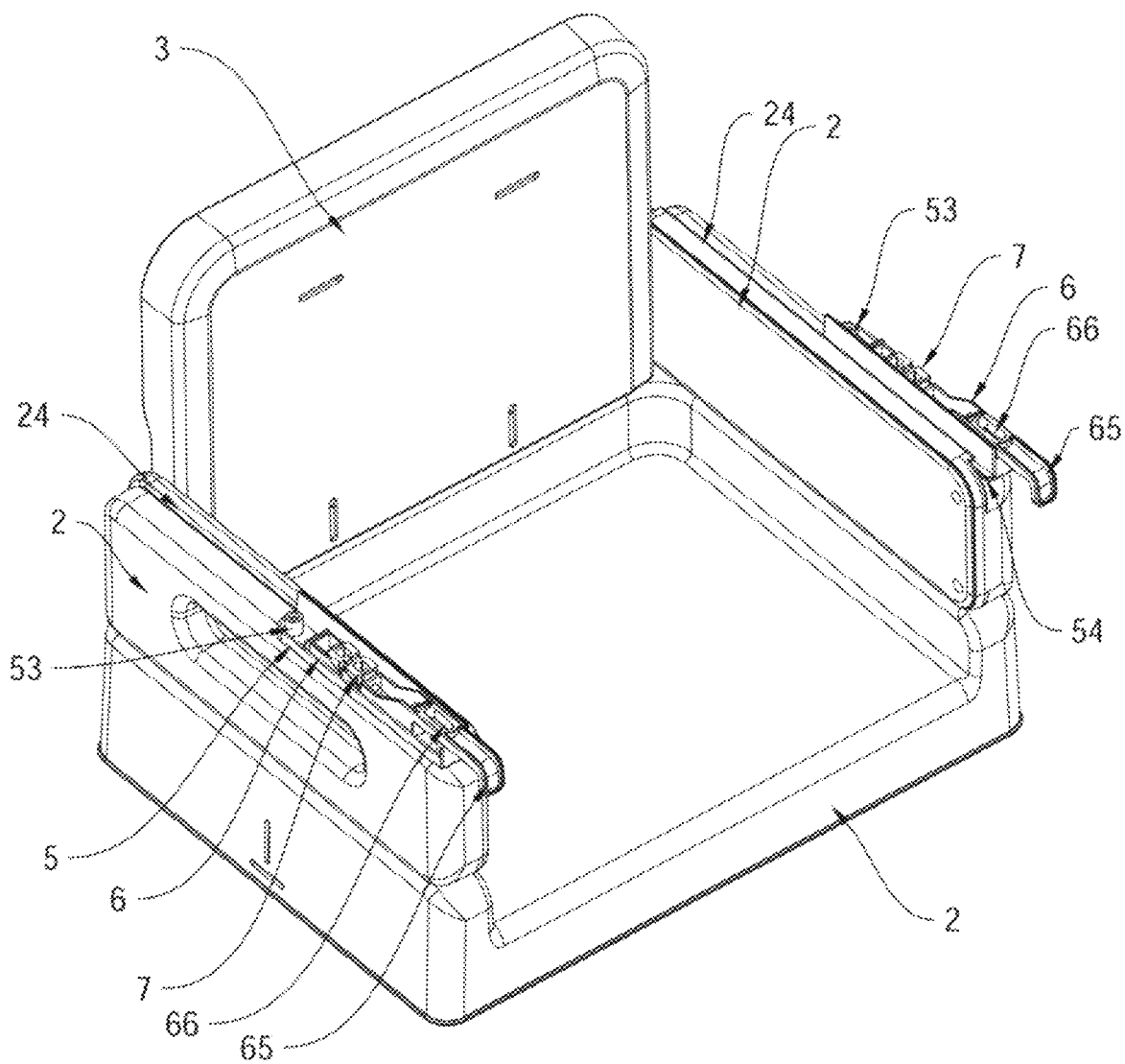
FIG. 8 is a schematic structural diagram of an adjusting component after a dining board is disassembled.
Figure 9:
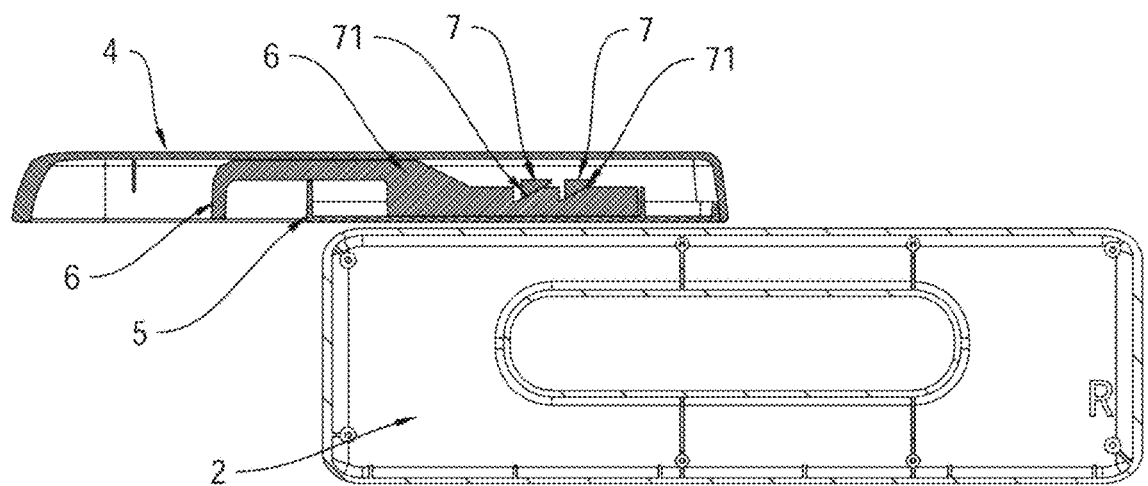
FIG. 9 is a first schematic cross-sectional view of an adjusting component at a dining board and a handle.

Furthermore, the adjusting seat 5 is equipped with a plurality of installation support arrises 51. The installation support arrises 51 penetrate into the first adjusting slot 631. An installation space for installing the adjusting block 7 is formed in the installation support arrises 51. As shown in FIG. 8, FIG. 10, and FIG. 11, the installation support arrises 51 are vertically arranged in the first adjusting slot 631. A total of four installation support arrises 51 are arranged at front, back, left and right sides, and are used for limiting four corners of the adjusting block 7 to prevent the adjusting block 7 from shifting.

A dining table structure is provided below the base 1, as shown in FIGS. 12-16, The dining table structure includes the plurality of first support legs 81, the pedal 9, and the second support legs 82. The first support legs 81 are detachably connected under the base 1. The pedal 9 are connected below the plurality of first support legs 81. The second support legs 82 are detachably connected under the pedal 9. The pedal 9 at least includes a left pedal 91 and a right pedal 92. An assembly structure 93 is provided between the left pedal 91 and the right pedal 92. A size of the left pedal 91 and a size of the right pedal 92 are adapted to a size of the base 1, so that the left pedal 91 and the right pedal 92 are stacked under the base 1 when separated.

In this patent, the assembly structure 93 is arranged at an end portion of the left pedal 91 and an end portion of the right pedal 92. The assembly structure 93 is specifically an insertion pin and an insertion slot. Both the left pedal 91 and the right pedal 92 are provided with the insertion pin and the insertion slot, and the insertion pins and the insertion slots on the left pedal 91 and the right pedal 92 are arranged in a staggered manner, so that the left pedal 91 and the right pedal 92 can be connected by mutual insertion.

Figure 15:
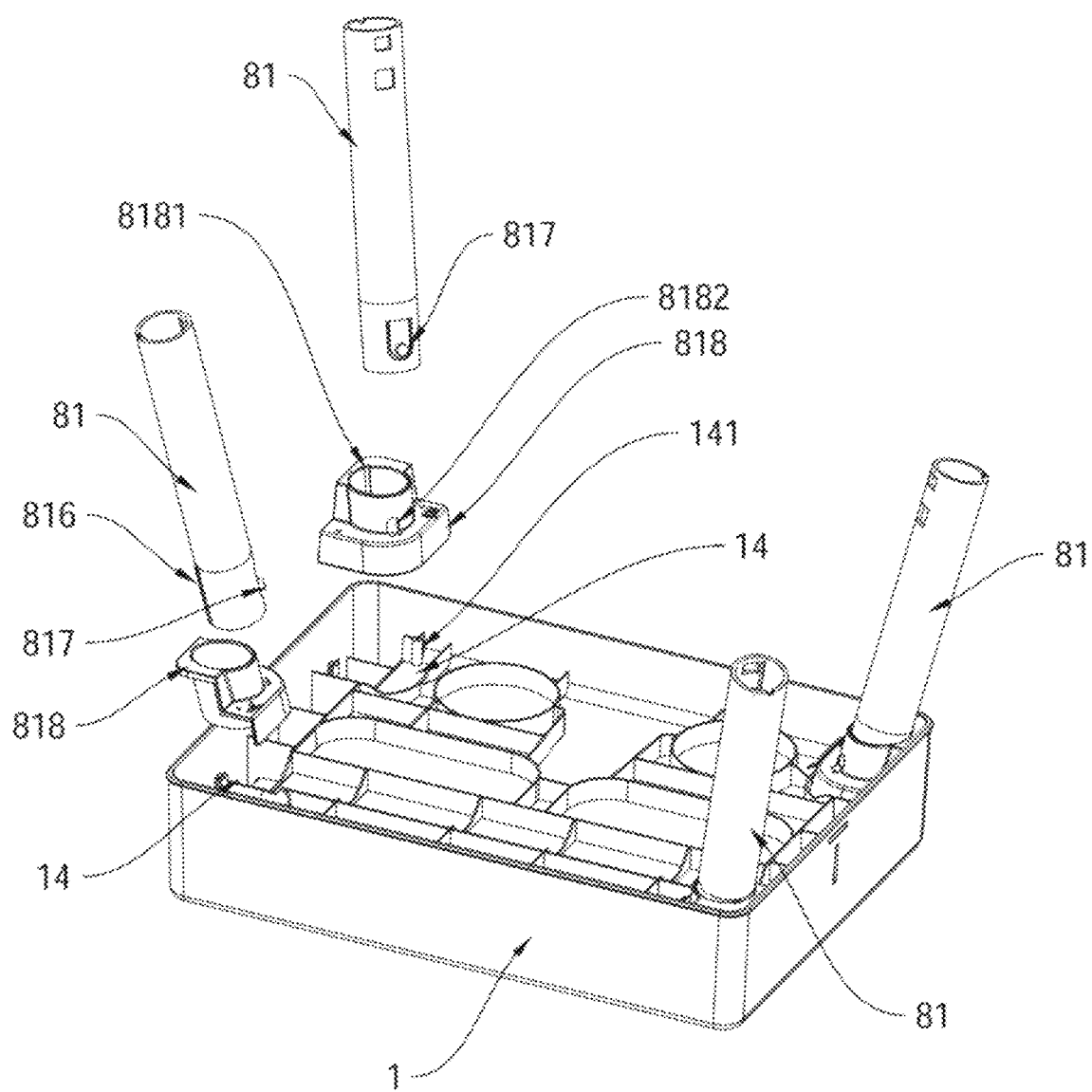
FIG. 15 is a schematic diagram of connection between first support legs and a base.

A total number of the first support legs 81 is four, and the four first support legs 81 are respectively fixed on four corners of the square base 1, as shown in FIG. 15. In fact, a concave cavity is defined below the base 1. Four corners of the concave cavity are detachably equipped with first support leg sockets 818. A cylindrical inner cavity is defined in the first support leg socket 818. Two sides of the inner cavity are respectively provided with a first guiding sliding slot 8181 and a first positioning engaging slot 8182. One side of the first support leg 81 is equipped with a first guiding sliding strip 816 corresponding to the first guiding sliding slot 8181, and an opposite side of the first support leg 81 is equipped with a first positioning engaging block 817 fixed in the first positioning engaging slot 8182. During installation, the first positioning engaging slot 8182 is opposite to the first positioning engaging block 817, so that an end portion of the first support leg 81 enters the first support leg socket 818. After the first positioning engaging block 817 is opposite to the first positioning engaging slot 8182, a snap connection is achieved.

The base 1 is equipped with socket fixing slots 14. A socket connecting column 141 is provided in the socket fixing slot 14. The first support leg socket 818 is provided with a connecting hole corresponding to the socket connecting column 141. As shown in FIG. 15, a plurality of first reinforcing ribs are provided in the concave cavity of the base 1. The first reinforcing ribs on four corners of the base 1 surround and form four socket fixing slots 14. The socket fixing slot 14 is internally equipped with the socket connecting column 141. The first support leg socket 818 is provided with the connecting hole corresponding to the socket connecting column 141. A fastening member is provided in the connecting hole to achieved connection. Therefore, the first support leg 81 and the first support leg socket 818 can be disassembled and stored under the base 1.

Figure 13:
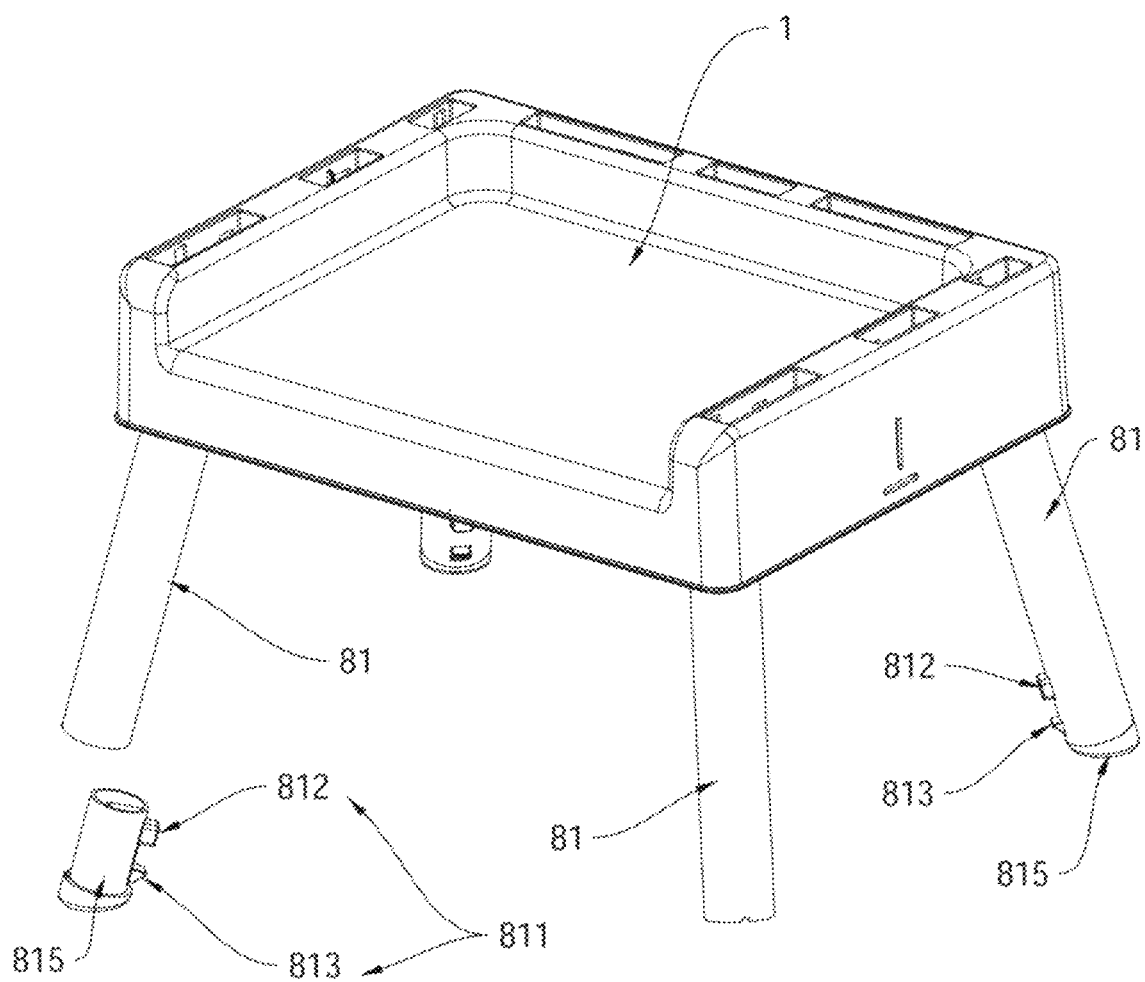
FIG. 13 is a schematic diagram of disassembly of a plug head of a first support leg.
Figure 14:
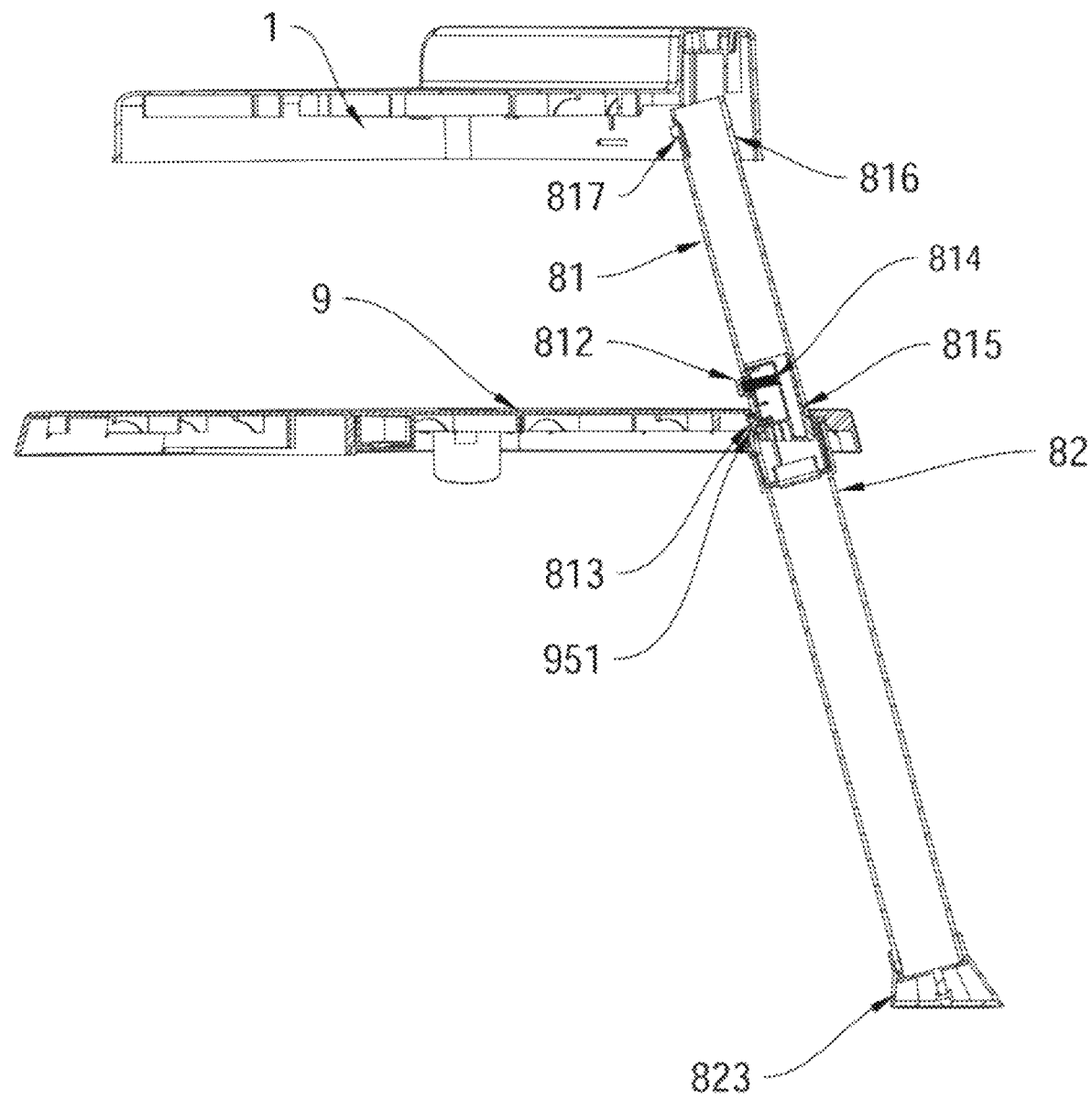
FIG. 14 is a schematic cross-sectional view when a pedal is connected under a first support leg.

The pedal 9 is connected to the first support leg 81 through a disassembly component. The disassembly component includes a movable member 811 fixed in the first support leg 81. The movable member 811 includes a disassembly operation end 812 and a disassembly snap-in end 813 that penetrate a side wall of the first support leg 81. The movable member 811 is also connected to a disassembly restoration member 814 that drives the disassembly operation end 812 and the disassembly snap-in end 813 to move outward from the first support leg 81. The pedal 9 is equipped with insertion holes 95. A disassembly snap-in slot 951 corresponding to the disassembly snap-in end 813 is defined in insertion hole 95. Referring to FIG. 13 and FIG. 14, the first support leg 81 is hollow. An end portion of the first support leg 81 is provided with one plug head 815. The plug head 815 is internally equipped with the movable member 811. The movable member 811 is a strip shape. An upper end and a lower end of the plug head 815 are respectively equipped with the disassembly operation end 812 and the disassembly snap-in end 813. The disassembly operation end 812 is a square button. The disassembly snap-in end 813 is a triangular inverted buckle. The disassembly restoration member 814 is a spring installed inside the plug head 815. The spring presses against the movable member 811, so that the disassembly operation end 812 and the disassembly snap-in end 813 on the movable member 811 are moved outward. Four corners of the pedal 9 are respectively provided with the insertion holes 95. An inner wall of the insertion hole 95 is provided with the disassembly snap-in slot 951. During installation, the disassembly operation end 812 is pressed to synchronously drive the disassembly snap-in end 813 inward. After that, the first support leg 81 is inserted into the insertion hole 95 of the pedal 9, and then the disassembly operation end 812 is released to allow the disassembly snap-in end 813 to enter the disassembly snap-in slot 951 to achieve connection. Similarly, the first support leg 81 and the pedal 9 which are connected to each other can be disassembled by pressing the disassembly operation end 812.

Furthermore, four corners of a bottom surface of the pedal 9 are each provided one fixing column. The second support leg 82 and the first support leg 81 are both hollow. One end of the second support leg 82 can be inserted outside the fixing column to achieve connection. A lower end of the second support leg 82 is also provided with a second support foot 823. The second support foot 823 is used for stable support on the ground. A placement cavity 941 of the pedal 9 is equipped with a plurality of second reinforcing ribs 942, and the second reinforcing ribs 942 are grid-shaped. The second reinforcing ribs 942 in an identical column form a positioning groove 943. Since the first support leg 81 and the second support leg 82 are hollow, the user can adjust an outer diameter of the first support leg 81 and an outer diameter of the second support leg 82 to place the first support leg 81 inside the second support leg 82 for storage, and then the first support leg 81 and the second support leg 82 stored together can be placed in the positioning groove 943 in the second reinforcing ribs 942 of an identical column to achieve positioning.

Figure 16:
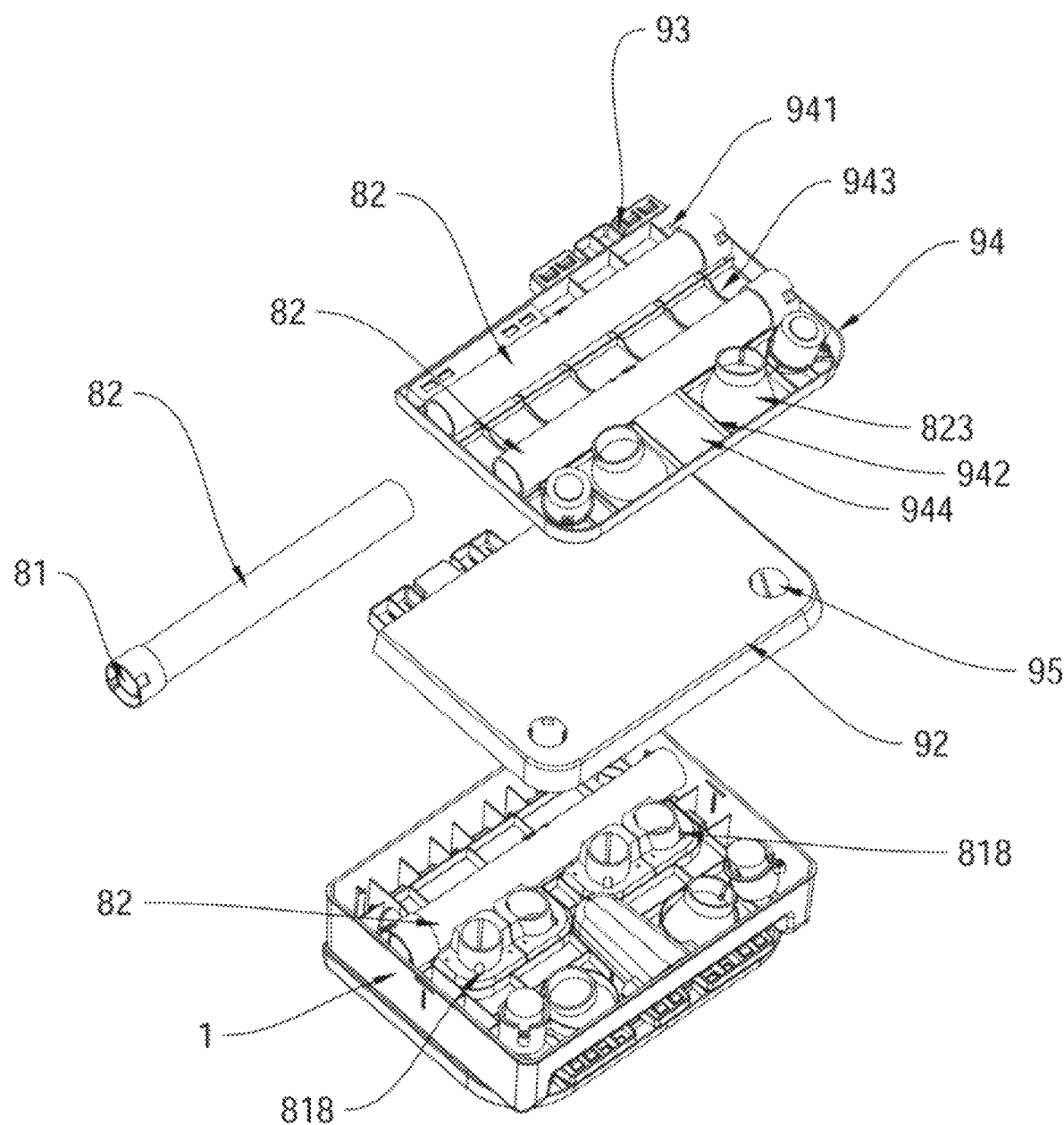
FIG. 16 is a schematic diagram of storage of a dining table.

The first support leg 81 and the second support leg 82 that are stored together can be placed in the placement cavity 941 of the left pedal 91 or the right pedal 92, as shown in FIG. 16. In this patent, when the left pedal 91 and the right pedal 92 are stored together, a surface of the left pedal 91 and a surface of the right pedal 92 are opposite to and abut against each other, so that the placement cavities 941 of the left pedal 91 and the right pedal 92 are arranged outwards. A part of the first support legs 81 and the second support legs 82 that are stored together is placed between the base 1 and the left pedal 91, and a part of the first support legs 81 and the second support legs 82 that are stored together is placed in the placement cavity 941 of the right pedal 92, thereby effectively utilizing the storage space in the left pedal 91 and the right pedal 92 to make the storage of the dining table after folding more compact. In addition, a placement slot 944 adapted to a size of a support foot is formed in the placement cavity 941 through the second reinforcing ribs 942. The placement slot 944 is formed by the grid-shaped reinforcing ribs 942, and the structure of the placement slot 944 is used for storing the plurality of second support feet 823 that have a small structure and are difficult to store.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:
1. A children's dining chair, comprising:
a base, wherein a left side, a right side, and a rear side of the base are provided with blocking walls, and a first storage slot is defined in the blocking walls;
handles detachably arranged on the left side and the right side of the base; and
a backrest detachably arranged on the rear side of the base;
wherein when the handles and backrest are disassembled from the base, the handles and the backrest are capable of being stored in the first storage slot,
wherein outer edges of the backrest are equipped with backrest blocking edges; a second storage slot is formed in the backrest blocking edges; and the second storage slot is used for storage and placement of the handle when the backrest is stored in the first storage slot.

2. The children's dining chair according to claim 1, wherein a top portion of the blocking wall is provided with splitting insertion slots; one end of the handle and one end of the backrest are provided with splitting insertion pins corresponding to the splitting insertion slots; the handle and the backrest are configured to be fixed on the base through the splitting insertion slot and the splitting insertion pin; one side of the handle near the backrest is provided with a side blocking portion; when the handle and the backrest are fixed on the base, the side blocking portion is supported on a rear side surface of the backrest; and the side blocking portion comprises a side blocking hook hooked on an outer blocking edge.

3. The children's dining chair according to claim 2, wherein the handle is provided with the plurality of splitting insertion pins; the splitting insertion pins are arranged at intervals in sequence; a gap portion is formed between adjacent splitting insertion pins; the splitting insertion pins on the two handles are arranged in a staggered manner, so that when the handles are stored, the splitting insertion pins on one of the handles are positioned in the gap portions of the other one of the handles; the splitting insertion pins at least comprise short splitting insertion pins arranged at both ends of the handle, and a plurality of long splitting insertion pins positioned between the two short splitting insertion pins; one of the short splitting insertion pins is connected to the long splitting insertion pin; and when the handles are stored, the short splitting insertion pins on one of the handles are used for aligning with and abutting against the short splitting insertion pins on the other one of the handles.

4. The children's dining chair according to claim 2, wherein the splitting insertion pin is provided with elastic blocks, the splitting insertion slot is provided with splitting snap-fit slots, and the elastic blocks correspond to the splitting snap-fit slots.

5. The children's dining chair according to claim 1, wherein the handle is equipped with a detachable dining board; an adjusting component is provided between the dining board and the handle; and the dining board is slidable and adjustable on the handle through the adjusting component.

6. A children's dining chair, comprising:
a base, wherein a left side, a right side, and a rear side of the base are provided with blocking walls, and a first storage slot is defined in the blocking walls;
handles detachably arranged on the left side and the right side of the base; and
a backrest detachably arranged on the rear side of the base;
wherein when the handles and backrest are disassembled from the base, the handles and the backrest are capable of being stored in the first storage slot,
wherein the handle is equipped with a detachable dining board; an adjusting component is provided between the dining board and the handle; and the dining board is slidable and adjustable on the handle through the adjusting component, wherein the adjusting component comprises:
- an adjusting seat fixed on the dining board; wherein an adjusting cavity is defined between the adjusting seat and the dining board;
- an adjusting sliding strip slidably arranged in the adjusting cavity; and
- an adjusting block arranged on the adjusting sliding strip, wherein inclined surface portions in contact with each other are provided between the adjusting block and the adjusting sliding strip; adjusting limiting slots are defined in the handle; and the adjusting block is also equipped with an adjusting limiting end for passing through the adjusting seat and positioned in the adjusting limiting slot;
- wherein the adjusting cavity is also internally equipped with a first adjusting restoration member and a second adjusting restoration member; the first adjusting restoration member is used for giving the adjusting limiting end a tendency to move towards the adjusting limiting slot, and the second adjusting restoration member is used for giving the adjusting sliding strip a sliding tendency, so that the inclined surface portions between the adjusting block and the adjusting sliding strip are in contact with each other and slide.

7. The children's dining chair according to claim 6, wherein the handle is provided with the plurality of adjusting limiting slots, so that an adjusting end of the adjusting block is positioned in different adjusting limiting slots through the sliding of the adjusting sliding strip.

8. The children's dining chair according to claim 6, wherein one end of the adjusting sliding strip is provided with a first adjusting portion; a first adjusting slot is defined in the first adjusting portion; and a slot wall of the first adjusting slot is provided with the inclined surface portion.

9. The children's dining chair according to claim 8, wherein the adjusting seat is equipped with a plurality of installation support arrises; the installation support arrises penetrate into the first adjusting slot; and an installation space for installing the adjusting block is formed in the installation support arrises.

10. The children's dining chair according to claim 8, wherein an opposite end of the adjusting sliding strip is provided with a second adjusting portion; a second adjusting slot is defined in the second adjusting portion; the adjusting seat is provided with a restoration support arris penetrating into the second adjusting slot; and the second adjusting restoration member is arranged between the restoration support arris and a slot wall of the second adjusting slot.

11. The children's dining chair according to claim 6, wherein one end of the adjusting sliding strip extends outward and bends towards one side to form an operating portion; the adjusting seat is connected to the dining board through adjusting fastening pins; an adjusting strip-shaped slot for accommodating the adjusting fastening pin is defined in the adjusting sliding strip; the handle is equipped with a guiding slot with a slot opening perpendicularly intersecting with a movement direction of the adjusting block; and the adjusting seat is equipped with a guiding engaging strip positioned inside the guiding slot.

12. A children's dining chair, comprising:
- a base, wherein a left side, a right side, and a rear side of the base are provided with blocking walls, and a first storage slot is defined in the blocking walls;
- handles detachably arranged on the left side and the right side of the base; and
- a backrest detachably arranged on the rear side of the base;
- wherein when the handles and backrest are disassembled from the base, the handles and the backrest are capable of being stored in the first storage slot; and wherein the children's dining chair further comprises a pedal and a support leg component, wherein the support leg component is detachably connected below the base; the pedal is detachably sleeved onto the support leg component; the pedal at least comprises a left pedal and a right pedal; an assembly structure is provided between the left pedal and the right pedal; and a size of the left pedal and a size of the right pedal are adapted to a size of the base, so that the left pedal and the right pedal are stacked under the base when separated.

13. The children's dining chair according to claim 12, wherein the support leg component comprises first support legs and second support legs; the first support legs are detachably connected under the base; the second support legs are detachably connected under the pedal; an outer edge of the left pedal and an outer edge of the right pedal are provided with surrounding walls; a placement cavity is defined in the surrounding wall; and the placement cavity is used for placement of the detached first support leg or the detached second support leg.

14. The children's dining chair according to claim 13, wherein second reinforcing ribs are provided in the placement cavity; and the plurality of second reinforcing ribs are provided with positioning grooves for positioning the first support leg or the second support leg placed in the placement cavity.

15. The children's dining chair according to claim 13, wherein the base is equipped with detachable first support leg sockets; two sides inside the first support leg socket are respectively provided with a first guiding sliding slot and a first positioning engaging slot; one side of the first support leg is equipped with a first guiding sliding strip corresponding to the first guiding sliding slot; an opposite side of the first support leg is equipped with a first positioning engaging block fixed in the first positioning engaging slot; the base is equipped with socket fixing slots; a socket connecting column is provided in the socket fixing slot; and the first support leg socket is provided with a connecting hole corresponding to the socket connecting column.

16. The children's dining chair according to claim 13, wherein a disassembly component is provided between a leg portion of the first support leg and the pedal; the disassembly component comprises a movable member fixed in the first support leg; the movable member comprises a disassembly operation end and a disassembly snap-in end that penetrate a side wall of the first support leg; the movable member is also connected to a disassembly restoration member that drives the disassembly operation end and the disassembly snap-in end to move outward from the first support leg; the pedal is equipped with insertion holes; and a disassembly snap-in slot corresponding to the disassembly snap-in end is defined in insertion hole.

17. The children's dining chair according to claim 16, wherein the first support leg is hollow; an end portion of the first support leg is provided with a plug head; and the plug head is internally equipped with the movable member and the disassembly restoration member.

18. The children's dining chair according to claim 13, further comprising second support feet, wherein the second support foot is fixed under the second support leg and is used for stable support on the ground; and a placement slot adapted to a size of a support foot is formed in the placement cavity through the second reinforcing ribs.

19. The children's dining chair according to claim 13, wherein the first support leg is hollow; and the first support leg is used for being inserted into the second support leg for storage.

\* \* \* \* \*